Sept. 23, 1958 G. D. PARKER 2,852,886
BICYCLE SIGNAL
Filed April 17, 1956 2 Sheets-Sheet 1
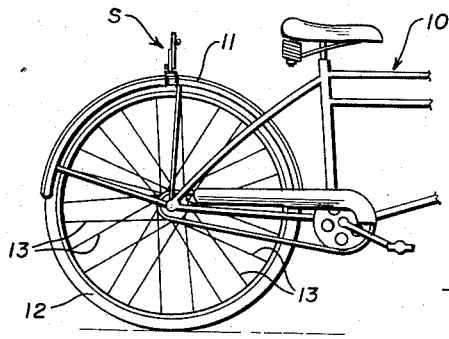
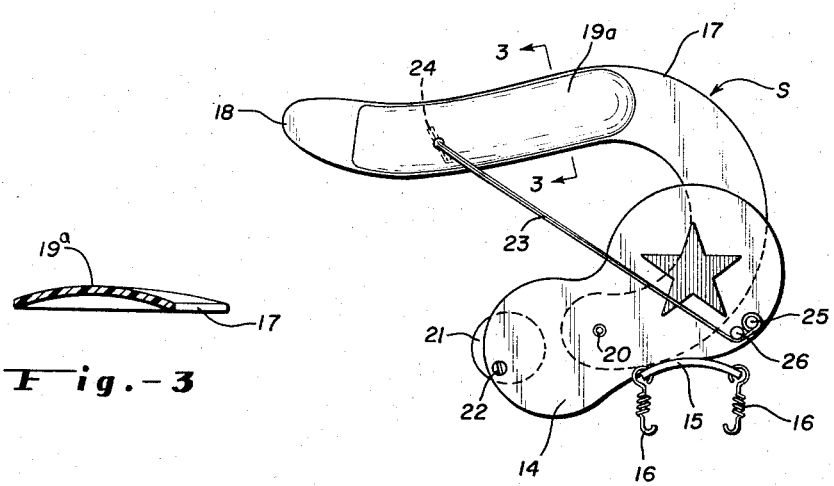
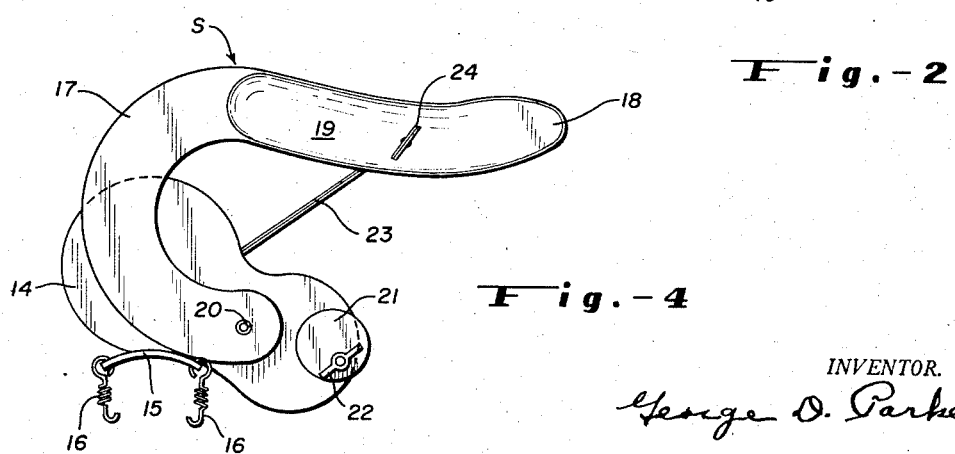
INVENTOR.
George D. Parker Sept. 23, 1958     G. D. PARKER     2,852,886
BICYCLE SIGNAL Filed April 17, 1956     2 Sheets-Sheet 2

INVENTOR.
George D. Parker

United States Patent Office 2,852,886
Patented Sept. 23, 1958

2,852,886
BICYCLE SIGNAL
George D. Parker, Denver, Colo.
Application April 17, 1956, Serial No. 578,811
1 Claim. (Cl. 46—175)

My invention relates to an improved safety device for use on bicycles, or the like, for giving a visible signal to drivers and occupants of vehicles, and also to pedestrians, as well as giving an audible signal or warning to such persons when and if desirable, either during daylight hours or at night.

The present invention is an improvement upon my copending application Serial Number 289,095, now Patent No. 2,741,948, entitled Bicycle Flashing Reflector.

One of the objects of my invention is to provide a safety device which is easily visible by day and by night and which also gives an audible warning or signal to pedestrians and vehicle drivers and passengers, thus assuring their safety by preventing accidents.

Another and important object of my invention is to provide a safety signal as aforesaid in which the volume of the audible signal given may be varied at the will of the rider of the bicycle upon which the signal device is mounted; it being another object of the invention to provide the signal device with a minimum of parts, thus reducing its cost and permitting its manufacture by high production methods and procedure.

A further object of the invention is to provide an improved visible and audible safety signal device which is capable of easy attachment to either the front or back fender of a bicycle and likewise easy removal therefrom, in which the device, when so attached remains firmly in place and is unaffected by vibrations and other noises created by the bicycle when in operation.

A still further object of the invention resides in providing an improved safety signal device as set forth above which is capable of being easily and quickly moved or shifted, by the rider, from one extreme position, namely a visible position above the fender and wheel of the bicycle, to the opposite extreme position, namely an audible position, with a part thereof disposed within the path of the wheel spokes as the wheel rotates in use; it being another object to provide such a safety signal device in which there is no dead-center or static position of the movable portion of the device between its extreme positions of use and wherein means is provided for assisting the movement between the extreme positions as well as maintaining the device in those positions against accidental displacement.

Another object is to provide a safety signal device as aforesaid whose non-movable and movable portions may be formed from plastic by a simple die casting operation to produce parts capable of interchangeable use as rights or lefts dependent upon whether the signal device is to be mounted upon the front or the back fender of a bicycle.

The foregoing and other objects and advantages of the present invention will appear from the following description and appended claim when considered in conjunction with the accompanying drawings forming a part of this specification wherein like reference characters designate corresponding parts in the several views.

In said drawings:

Fig. 1 is a fragmentary side elevation of the rear half or portion of a bicycle, showing one application of the safety signal device of my invention thereto;

Fig. 2 is an enlarged scale elevational view of the device unmounted, and looking toward the right in the showing of Fig. 1;

Fig. 3 is a further enlarged scale fragmentary section taken substantially along the line 3—3 of Fig. 2, looking in the direction of the arrows;

Fig. 4 is a view similar to Fig. 2 but looking at the safety signal as though viewed toward the left in Fig. 1;

Figure 5:
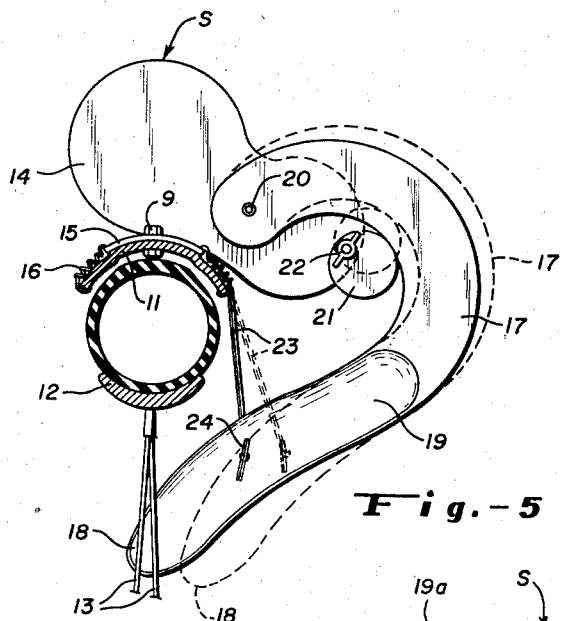
Fig. 5 is a view similar to Fig. 4 but showing the device in one of its mounted positions, and with the movable portion thereof in its extreme sound-producing or audible position.
Figure 6:
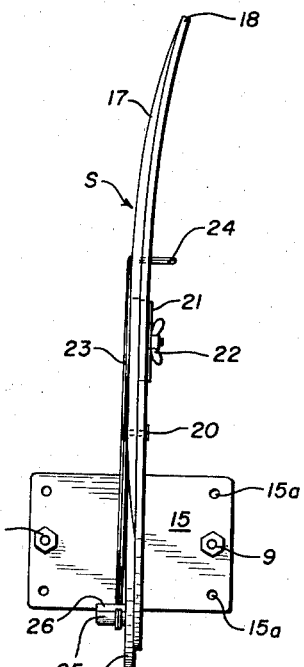
Fig. 6 is an edge view of the device, looking down at the mounting plate and associated parts of the device as seen in Fig. 2.

Referring now to the drawings wherein there is shown a preferred form of my present invention, 10 represents the rear portion or half of a conventional bicycle which has the usual rear fender or mudguard 11 carried by the frame above a rear wheel 12 provided with wire spokes 13. The new and novel safety signal device of my present invention is shown as a whole at S, and in Fig. 1 is seen as mounted upon the rear fender 11. The device S may, however, be mounted upon the bicycle in any other desirable location or position as, for example, upon the bicycle front fender (not shown).

Figure 7:
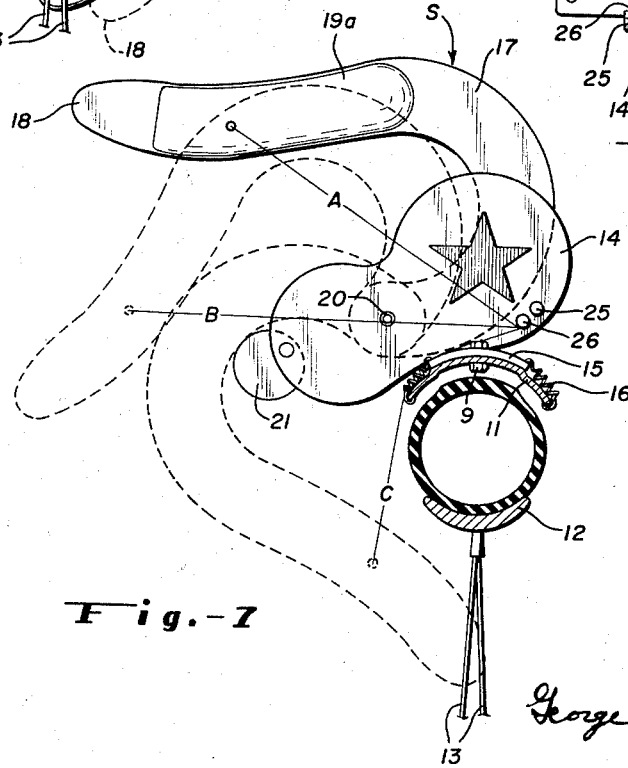
Fig. 7 is a view generally similar to Fig. 2 and illustrating the two extreme signalling positions of the movable portion of the device and an intermediate position thereof.

The signal device as shown in the drawings is indicated as a whole at S. It comprises a non-moving base portion 14 having an attaching plate 15 for mounting the signal device upon a bicycle, for example, upon the rear fender or mud guard 11 thereof. Plate 15 may be attached to the fender by bolt and nut assemblies 9. In addition plate 15 may be provided with holes or openings 15a into which are passed the inner ends of spring-like hook members 16. As seen in Figs. 5 and 7, the spring hooks 16 grip the edges of fender 11 and serve to prevent metal-to-metal noises or rattles which may be caused by vibration, set up during the operation of the bicycle.

The signal device comprises a movable member, such as a curved arm or blade 17 having an outer end or tip portion 18. This arm is swingably connected to and mounted upon the non-moving portion or section 14 by a pin or rivet 20. It is desirable to provide the device with means which reflects light, such as a luminous surface or surfaces. As shown, one face or surface of arm 17 is provided with a luminous coating or covering 19, the other side or surface having a generally similar luminous coating or covering 19a.

It will be understood that the movable member or arm 17 is adapted to be swung in a clockwise direction from its so-called visible-signaling position seen in Fig. 4, to its audible signaling position, as seen in Fig. 5. In the latter position, the tip or lead end 18 of the arm (see Fig. 5) is at its extreme down position projecting or extending into a position between adjacent spokes 13 of the wheel and in the path thereof to be flexed and vibrated during the rotation of wheel 12.

It is desirable to regulate or limit the downward movement of arm 17 so as to vary the amount of tip portion 18 which projects into the path of spokes 13. It is also desirable to provide means for regulating the position of the arm 17 with relation to the spokes because of the variation of the size of the bicycle and its component parts upon which the signal device is mounted. For these purposes I provide preferably an eccentrically mounted disk or stop member 21 which is held to the heel portion of the non-moving base assembly 14 of the safety signal device by a combined pivot and tightening bolt and wing nut assembly 22. Since the inner end of curved arm 17 swings in a plane which is adjacent and parallel to the plane of the non-moving portion 14 it will be understood that, by mounting eccentric disk 21 in the particular location on portion 14 shown, the near edge of arm 17 will abut it when approaching its down position. In full lines Fig. 5, arm 17 is shown at the extreme or full down limit of its swinging movement, with the under or near edge of said arm engaging the periphery of disk member 21. Another or adjusted position of disk or stop member 21 is indicated in broken lines in Fig. 5. In this position, the arm 17 is also shown in broken lines and when it engages the periphery of disk 21, the tip portion or lead end 18 of the arm is maintained away from and out of the path of rotative movement of the wheel spokes 13. While I have shown, merely by way of example, an eccentric disk 21, various other means may be substituted for limiting the extent of outward and downward movement of the signaling arm member or blade 17. Moreover, it is entirely possible that the adjustable stop means 21 may have its position reversed. That is to say, the stop means itself may be carried by the movable arm to contact the edge of the fixed or non-moving portion 14 of the base assembly. The sound created by the spokes successively striking the tip portion 18 may be varied in intensity by adjusting the eccentric disk 21 so as to cause the tip end 18 to project further, or to a lesser degree, into the path of movement of the spokes.

It is, of course, desirable that the rider of the bicycle be able to shift easily and quickly the arm 17 from one extreme signaling position to the other extreme signaling position while the bicycle is in motion. That is to say, it is desirable that the signal device be such that the rider can grasp the arm 17 with one free hand and swing it about its pivot 20 from its uppermost visible-signaling position of Fig. 2 or 4 to its lowered sound-producing position or audible-signaling position of Fig. 5. It will be understood that the curved arm 17 is swung in its vertical plane toward the right side of the wheel when mounted in one position upon fender 11, and as viewed in Fig. 5, for example, and would be swung in an upright or vertical plane toward the left side of wheel 12, when mounted in another or reverse position upon the fender 11. In other words, the signaling device S is, so to speak, universally mountable upon either the rear fender or mudguard 11, upon the front fender (not shown), or elsewhere upon the frame portion of a bicycle so as to swing toward the right or left side of the adjacent wheel.

The device S is provided with means for holding the signal arm 17 in both of its extreme signaling positions. With reference particularly to Figs. 2 and 4, there is shown therein an elastic or resilient member 23 which is passed through an opening formed in arm 17 and which carries a ring or stop member 24 to removably hold the elastic member in position with relation to arm 17. The opposite end of the elastic member (which may be an ordinary rubber band) is passed around a guide stud or pin 26 on the fixed or non-moving member or portion 14 of the signal device and then engaged with another pin or stud 25 which is also carried by member 14. By maintaining the swingable arm 17 at all times under tension, it will be understood that the band, spring, or the like 23 will hold said arm in either its upper visible signaling position of Figs. 2, 4 and 7, or in its extreme down or sound-producing or audible-signaling position, shown in full lines and also in broken lines in Fig. 5.

It is desirable to bow the arm or movable blade 17 in a transverse direction adjacent to its lead or tip end portion 18. Such bow or curvature is illustrated in Fig. 3. Since the convex face or surface of arm 17, carrying the luminous material 19a, is presented forwardly toward the bicycle seat and, of course, is facing in the direction of movement of the bicycle, wind resistance will be reduced and additionally, the tip end 18 will be more easily flexed to give off an augmented snapping sound during the rotative movement of the contacting spokes 13.

Fig. 7 illustrates the precision proportioning and positioning of the pivot or point of swinging connection of the arm 17 with relation to the non-moving portion 14 of the signal device. The three lines and the letters "A," "B," and "C" indicate the different positions of the signal arm 17 in its respective up, down, and intermediate positions. "A" represents the uppermost position; "B" the intermediate position; and "C" the lowermost position. There is no dead center position and the operator, upon moving the arm in a vertical plane to a mid-point between up and down limits, is assured that the tensioning action of resilient member 23 will complete the movement or shifting of said arm.

While the device may be formed from any suitable material, it is desirable to produce the safety signaling device of my present invention from plastic. In view of its simplicity, it can be die cast in no more than two pieces, one piece comprising both the non-moving portion 14 and the eccentric disk-like stop member 21, and the other piece being the swingable arm, or blade member 17; or the disk 21 may be cast separately, or with said arm or member 17. The complete device comprises a minimum of parts and it may be assembled easily at the end of a production line. Moreover, it is likewise easily mounted or installed upon a bicycle. By virtue of the provision of the simple rubber band tensioning means 23 for the swingable arm 17, any child who operates a bicycle with one of my safety devices installed thereupon, can readily replace a broken band with a new one, thus maintaining the safety signal device in workable condition at all times.

My improved safety device, because of its luminous surface or surfaces, provides a safety measure of protection by giving warning to operators of other vehicles at night; and because of its sound-producing or audible characteristic, it provides a warning signal for pedestrians, and others, thus becoming a safety measure during daylight hours, as well. In addition to the safety factors for day and night use of a bicycle, my new and novel, audible and/or visible signaling device also satisfies younger children by being, in effect, a toy which has an inherent measure of safety.

Having thus described my invention, what is claimed is:

In a safety signal device, a base portion adapted for mounting upon a bicycle, above a wheel thereof, a movable signal member swingably carried by the base and movable in a plane substantially perpendicular to said base from a position out of the path of rotative movement of the spokes of said bicycle wheel to a position in said path to be contacted by said spokes as the wheel rotates, means for maintaining the movable signal member in either of said positions, and adjustable eccentric means carried by the base portion and cooperable with the movable signal member for controlling the extent of swinging movement of said signal member from said out-of-path position to the position in the path of movement of the spokes.

References Cited in the file of this patent

UNITED STATES PATENTS

| | | |
|---|---|---|
| 1,344,376 | Brodin | June 22, 1920 |
| 2,459,693 | Gordon | Jan. 18, 1949 |
| 2,633,097 | Frew | Mar. 31, 1953 |
| 2,761,244 | Weih | Sept. 4, 1956 |